(12) United States Patent
Bueno et al.

(10) Patent No.: US 9,596,206 B2
(45) Date of Patent: Mar. 14, 2017

(54) IN-LINE IMAGES IN MESSAGES

(71) Applicants: Carlos M. Bueno, San Francisco, CA (US); John R. Allen, Mountain View, CA (US)

(72) Inventors: Carlos M. Bueno, San Francisco, CA (US); John R. Allen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 18 days.

(21) Appl. No.: 13/648,156

(22) Filed: Oct. 9, 2012

(65) Prior Publication Data

US 2014/0101266 A1    Apr. 10, 2014

(51) Int. Cl.
*H04L 12/58* (2006.01)

(52) U.S. Cl.
CPC ............. *H04L 51/32* (2013.01); *H04L 51/08* (2013.01)

(58) Field of Classification Search
CPC .. G06Q 30/0267; G06Q 50/01; H04L 43/045; H04L 51/04; H04L 51/32; H04L 51/08; H04M 1/72519
USPC .......... 709/201–204, 206, 207, 227
See application file for complete search history.

(56) References Cited

U.S. PATENT DOCUMENTS

| | | | | |
|---|---|---|---|---|
| 6,629,793 B1 * | 10/2003 | Miller | | 400/472 |
| 7,091,976 B1 * | 8/2006 | Ostermann | G06T 13/40 | 345/473 |
| 7,729,989 B1 * | 6/2010 | Yuen | G06Q 20/12 | 705/44 |
| 7,991,401 B2 * | 8/2011 | Linder et al. | | 455/438 |
| 8,112,490 B2 * | 2/2012 | Upton et al. | | 709/208 |
| 8,239,326 B1 * | 8/2012 | Yuen | G06Q 20/385 | 705/35 |
| 8,302,015 B2 * | 10/2012 | Krishnan et al. | | 715/747 |
| 8,346,864 B1 * | 1/2013 | Amidon | H04L 65/1069 | 709/204 |
| 8,460,099 B2 * | 6/2013 | Barclay et al. | | 463/31 |
| 8,606,855 B2 * | 12/2013 | Bhogal | G06F 17/24 | 709/204 |
| 2002/0156871 A1 * | 10/2002 | Munarriz | G06F 17/30569 | 709/219 |
| 2004/0172254 A1 * | 9/2004 | Sharma | A61K 8/411 | 704/270.1 |
| 2005/0100147 A1 * | 5/2005 | Naick | G06F 1/1626 | 379/93.24 |
| 2005/0144237 A1 * | 6/2005 | Heredia et al. | | 709/206 |

(Continued)

FOREIGN PATENT DOCUMENTS

KR    10-2004-0064310 A    7/2004
KR    10-2007-0079657 A    8/2007

OTHER PUBLICATIONS

Int'l. Search Report and Written Opinion from Int'l. Application No. PCT/US20013/061103, Jan. 16, 2014.
First Office Action for TW 102136509, Dec. 6, 2016.

*Primary Examiner* — Sargon Nano
(74) *Attorney, Agent, or Firm* — Baker Botts L.L.P.

(57) ABSTRACT

In one embodiment, a computing device detects an identifier of an object entered by a user participating in a message session. The message session includes one or more messages including text, and the text includes the identifier. The computing device accesses an image corresponding to the object based at least in part on the identifier. The computing device provides for display to a second user the image in place of the identifier within the text.

20 Claims, 6 Drawing Sheets

(56) References Cited

U.S. PATENT DOCUMENTS

| | | | |
|---|---|---|---|
| 2005/0262208 A1* | 11/2005 | Haviv | G06Q 10/107 709/206 |
| 2006/0072721 A1* | 4/2006 | Wisniewski | G06F 17/30905 379/88.22 |
| 2006/0079293 A1* | 4/2006 | Nelson | H04M 1/72547 455/566 |
| 2006/0141923 A1* | 6/2006 | Goss | G06Q 30/02 455/3.01 |
| 2007/0239631 A1 | 10/2007 | Wang | |
| 2007/0271340 A1* | 11/2007 | Goodman | G06Q 10/107 709/206 |
| 2008/0010148 A1* | 1/2008 | Knibiehly | G06Q 30/00 705/14.23 |
| 2008/0039124 A1* | 2/2008 | Linder et al. | 455/466 |
| 2008/0141150 A1* | 6/2008 | Kalaboukis | G06F 3/0481 715/764 |
| 2009/0094512 A1* | 4/2009 | Szeto | 715/234 |
| 2009/0110246 A1* | 4/2009 | Olsson | H04M 1/72544 382/118 |
| 2009/0119308 A1 | 5/2009 | Clark | |
| 2009/0124268 A1* | 5/2009 | McNamara | G06Q 30/02 455/466 |
| 2010/0105438 A1* | 4/2010 | Wykes | G06F 3/0482 455/566 |
| 2010/0302254 A1* | 12/2010 | Min et al. | 345/473 |
| 2011/0078564 A1 | 3/2011 | Almodvar Herraiz | |
| 2011/0185385 A1* | 7/2011 | Park et al. | 725/40 |
| 2012/0041939 A1* | 2/2012 | Amsterdamski | G06F 17/30867 707/709 |
| 2012/0084671 A1 | 4/2012 | Enete | |
| 2012/0221581 A1* | 8/2012 | Narayanan | G06F 17/30958 707/748 |
| 2012/0271883 A1* | 10/2012 | Montoya et al. | 709/204 |
| 2013/0018837 A1* | 1/2013 | Lee | 706/52 |
| 2013/0031475 A1* | 1/2013 | Maor et al. | 715/706 |
| 2013/0093828 A1* | 4/2013 | Enete et al. | 348/14.01 |
| 2013/0097093 A1* | 4/2013 | Kolber | G06Q 10/1053 705/321 |
| 2014/0040783 A1* | 2/2014 | Goldman et al. | 715/757 |
| 2014/0047373 A1* | 2/2014 | Kim | 715/773 |

* cited by examiner

IN-LINE IMAGES IN MESSAGES

TECHNICAL FIELD

This disclosure generally relates to social-networking systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a computing device (which may be a server of a social-networking system) may detect that a user (e.g. of the social-networking system) participating in a message session has entered an identifier of an object in the text of a message of the message session. The object may, for example, be another user of the social-networking system or a concept represented within the social-networking system. The identifier may, for example, be a URL (or a portion of a URL), a numerical identifier, or a vanity identifier, and may have a particular format that allows the computing device to detect it. The computing device, using the identifier, may access an image corresponding to the object. The computing device may provide for display to a second user (e.g. a recipient of the message) the image in place of the identifier within the text of the message. The image may, for example, only be displayed to the second user if the second user has permission to view the image. The image may be scaled to a size depending on the size of the text in the message.

DESCRIPTION OF EXAMPLE EMBODIMENTS

Figure 1:
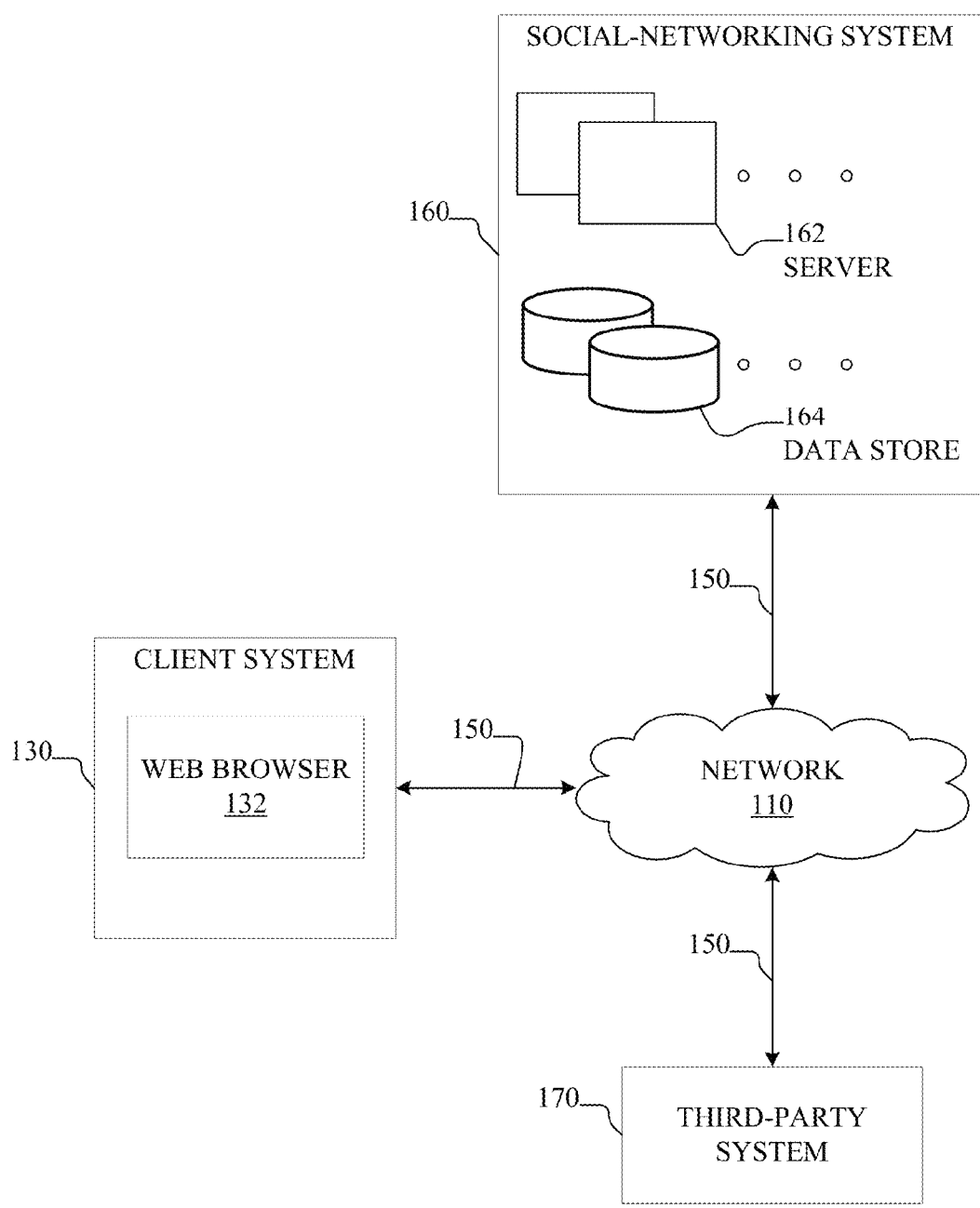
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for display to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g. that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client device 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client device 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client devices 130 or one or more third-party system 170 via network 110. The web server may include a mail server or other messaging functionality for receiving and routing messages between social-networking system 160 and one or more client devices 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client device 130. Information may be pushed to a client device 130 as notifications, or information may be pulled from client device 130 responsive to a request received from client device 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client devices 130 associated with users. Ad-pricing modules may combine social information, the current time, location information, or other suitable information to provide relevant advertisements, in the form of notifications, to a user.

Figure 2:
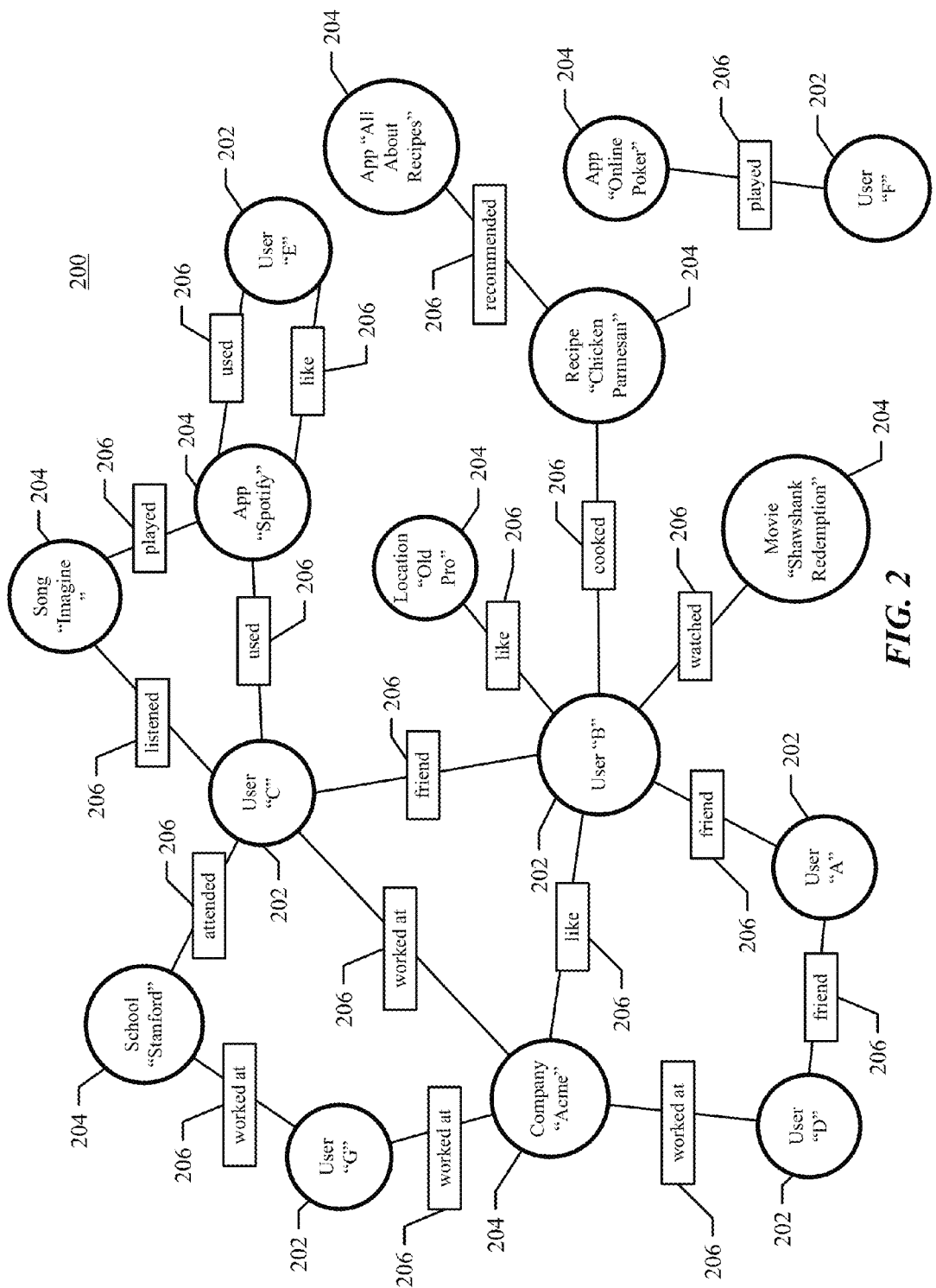
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
FIG. 3 illustrates an example message session with in-line images.

In particular embodiments, users of social-networking system 160 may communicate with one another via, for example, a messaging service. The messaging service may be hosted by a server 162 of social-networking system 160 and may include a messaging interface that allows users of the social-networking system to send each other messages including text and attachments (e.g. URLs, images, videos, or other files) in a message session. A message session may encompass multiple messages (e.g. multiple lines of text, including attachments) between users. In particular embodiments, the messaging interface may also include operability for users of the social-networking system to send each other messages including text and in-line images. An example message in a messaging interface with operability including in-line images is illustrated in FIG. 3. In the example of FIG. 3, images are displayed within lines of text in the message, rather than as separate attachments to the message. These images may be taken from a variety of sources, including, for example, images available to the users within social-networking system 160.

In particular embodiments, a user of a messaging interface in social-networking system 160 may insert an image into a line of text in a message by specifying the identifier of an object having an associated image. Within a line of text in a message, a user may type a text string in a particular format indicating an identifier for an object (e.g. a node in social-networking system 160), and an image associated with the object (e.g. an image associated with the node in social-networking system 160) may be displayed to a recipient of the message within the line of text. The object may be a concept node 204 (e.g. a place, website, entity, or resource), a user node 202 (e.g. an individual, entity, or group), a newsfeed item, a photo or photo album, or any other suitable object within or external to social-networking system 160, as appropriate. As an example, the object may be a webpage hosted by a third-party system 170 on a server external to social-networking system 160. The image may be an image associated with a concept node 204, a user node 202, or any other object, including, by way of example and without limitation, a profile picture associated with a user, a photo in an album associated with a place or a user, or a specific image chosen by a user (or node administrator) for use as an in-line message image. The image may also be an image in a webpage (e.g. hosted by a third-party system 170) on a server external to social-networking system 160, including, for example, an image in a news story that is linked in a newsfeed item. The text string typed by the user identifies the object, such that an image associated with the object may be fetched and displayed in-line to a recipient of the message based on the identifier. The text string identifier may include a full URL of an image file, a portion of a URL of an image file, an object identifier for an object of social-networking system 160 (e.g. a unique numerical identifier for a user node 202, a concept node 204, or a graph edge 206), or a unique vanity identifier for an object of social-networking system 160. As an example, the unique object identifier for a user node associated with the user Michael of social-networking system may be 17812. The vanity identifier for Michael may be "MichaelRulez!!," which also uniquely identifies the user node corresponding to Michael. The text string may be typed in a particular format indicating that the text string comprises an identifier for an object (and is not simply text of the message). As an example, if a user wishes to include an image of Michael within a line of text, the user may type (within the line of text) "[[17812]]", and when the line of text is displayed to a recipient of the message, an in-line image associated with Michael (e.g. Michael's profile picture) may be displayed where the string "[[17812]]" was typed. As another example, the user may type "[[MichaelRulez!]]" within the line of text, and when the line of text is displayed to a recipient of the message, the in-line image associated with Michael will be displayed where the string "[[MichaelRulez!]]" was typed. In the previous two examples, the double open bracket [[ and the double closed bracket]] denote that the text content inside (e.g. 17812 or MichaelRulez!) is an identifier for an object (e.g. the user node associated with Michael). Any suitable format for the text string may be used to indicate that the text string comprises an identifier for an object.

In particular embodiments, an API of the social-networking system may handle the fetching or displaying of in-line images in messages. As an example, a message server 162 of social-networking system 160 may recognize that the sender of a message in a message session has typed in the messaging interface a text string in a particular format indicating an object identifier (e.g. [[17812]]). In particular embodiments, message server 162 of social-networking system 160 performs a check on the identifier to determine if it is well-formed (e.g. using only letters and number, or any other set of allowed characters) and legitimate (e.g. corresponding to an object that exists). If, for example, the identifier is not well-formed or not legitimate, instead of displaying an image in-line, the message as displayed to the recipient may simply show the text string typed by the user (e.g. [[1781@]], which may not correspond to an existing object). If, for example, the identifier is well-formed and legitimate, but no photo is associated with the identified object, a blank image may be displayed in-line to the message recipient. In particular embodiments, the image displayed to the message recipient may be fixed in size, and in other embodiments, the image may be scaled based upon the text size of the message text. Additionally, the displayed image may be compliant with amended Section 508 of the U.S. Rehabilitation Act, such that if a user places her mouse over the image, the text string identifying the image (e.g. [[MichaelRulez!]]) may be displayed to the user.

When the browser (or other display interface) of the recipient of the message containing an object identifier receives the message, the browser may construct (e.g. in JavaScript) an API query or method call for an image (with arguments based on the object identifier in the message) to a server 162 of social-networking system 160. The server may verify whether the method is valid, whether the recipient user browser has the permission to call the method, and whether the arguments (e.g. the object identifiers) are well-formed and legitimate (as described above). Based on this, the server 162 may construct a URL for the image and deliver the URL or image to the browser of the recipient of the message. As described above, the recipient may see a text string (e.g. if the identifier is not well-formed or not legitimate) or a blank image (e.g. if the object identified does not have an associated image). Furthermore, the recipient user must have the adequate permissions (as stored in social-networking system 160) to see the in-line image. For example, if a sender attempts to send a message with an in-line image of a user profile picture that the recipient does not have permission to see, despite the identifier being well-formed, legitimate, and pointing to an object with an associated picture, the recipient may only see a blank image within the text due to lack of permission.

Figure 4:
FIG. 4 illustrates an example composite image.

In particular embodiments, as described above, one or more images may be fetched and displayed to the recipient of the message. FIG. 4 illustrates an example in which a single message session includes multiple in-line images, each image fetched based on an object identifier (and associated object). In this example, the multiple in-line images are arranged to produce a large, composite image. In other embodiments, an image or series of images in the GIF format may be fetched and displayed to the recipient of the message. Furthermore, although particular embodiments involving a messaging service have been discussed, in-line images may be employed throughout social-networking system 160, wherever text is used to communicate. As an example, if a user comments on a post by another user (an example of an edge 206) of social-networking system 160, the comment may include in-line images through the use of text strings of a particular format, as described above. Similarly, a post (such as a link or status update) may include text, and this text may also include in-line images. Additionally, other types of communication services, including email or chat services, may also include operability for in-line images.

Figure 5:
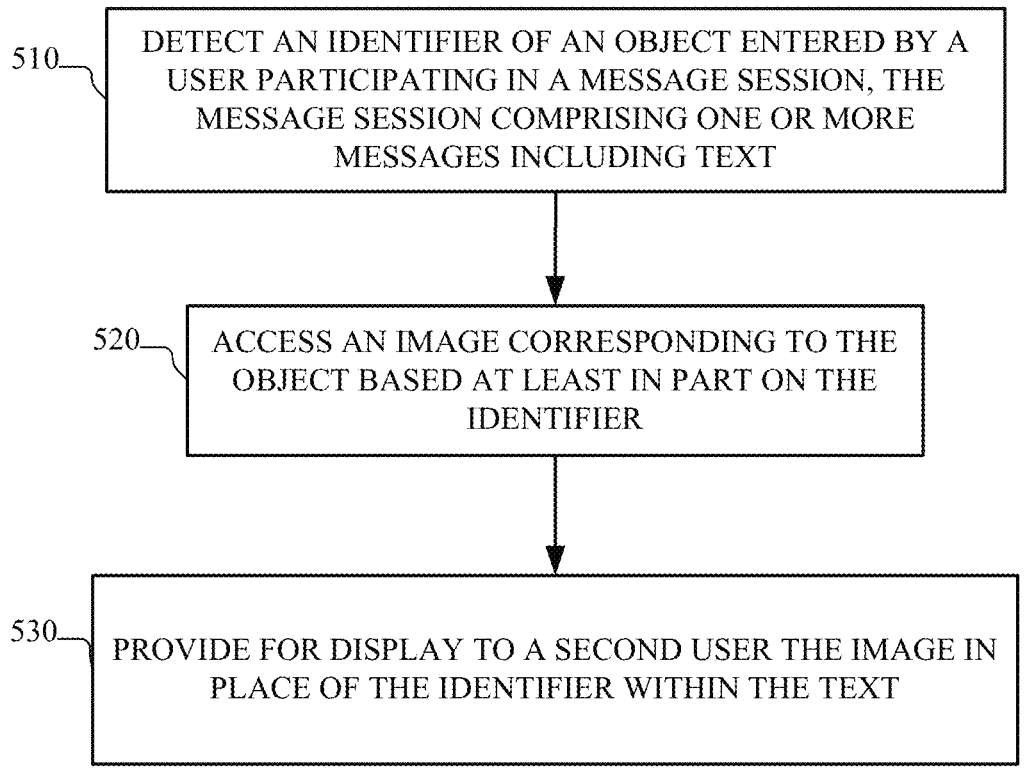
FIG. 5 illustrates an example method for sending an image in-line within a message.

FIG. 5 illustrates an example method for sending an image in-line within a message. The method begins at step 510, where a computing device (e.g. a message server 162 of social-networking system 160) detects an identifier of an object (e.g. user node 202 or concept node 204) entered by a user participating in a message session. The message session may comprise one or more messages including text, and the text includes the identifier. At step 520, the computing device accesses an image corresponding to the object based at least in part on the identifier. At step 530, the computing devices presents to a second user the image in place of the identifier within the text (e.g. in-line within the text of the message). Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
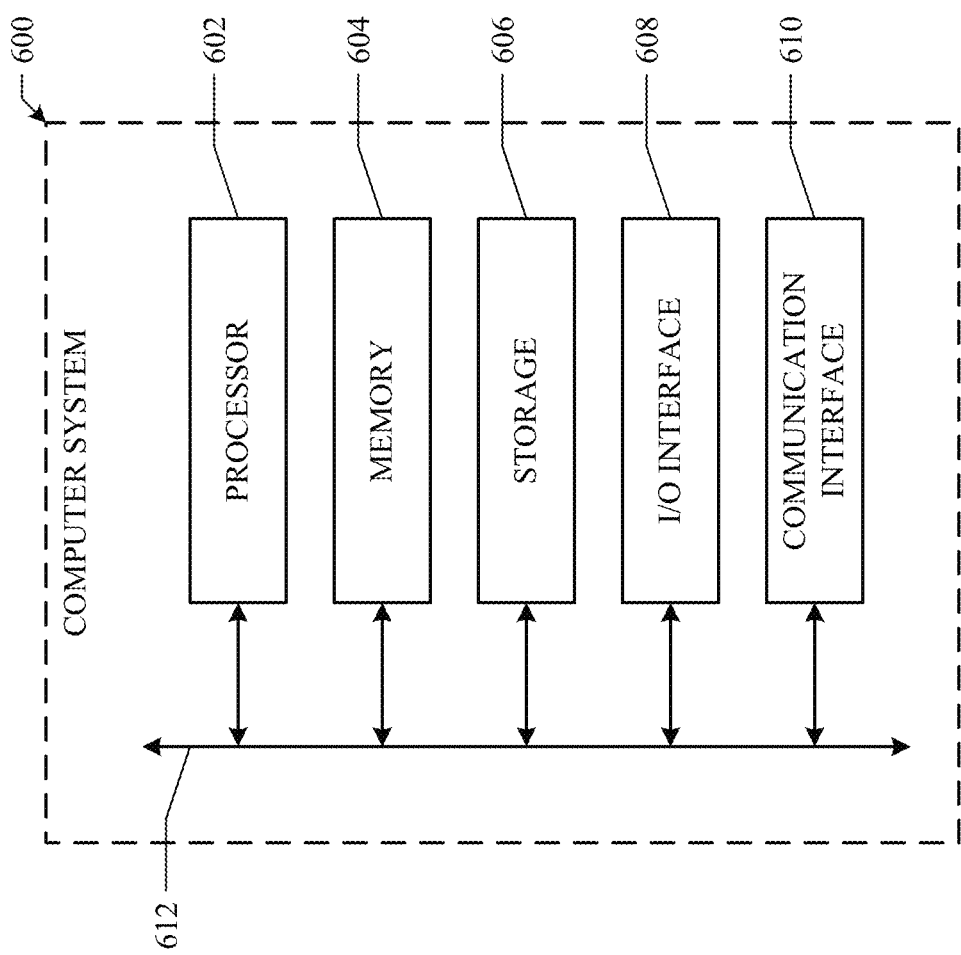
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by one or more computing devices, detecting entry of an identifier of an object by a first user participating in a message session, wherein the detecting is based on the identifier being in a pre-determined text format, the message session comprising a text message including the identifier;
    by the computing devices, determining a first node in a social graph of a social-networking system that corresponds to the object based at least in part on the identifier of the object, the graph comprising a plurality of nodes and edges connecting the nodes, wherein a second node in the graph corresponds to the first user;
    by the computing devices, accessing one or more images corresponding to the object associated with the first node in the social graph; and
    by the computing devices, sending the text message to a second user in which the identifier included in the text message is replaced with an in-line image within the text message, wherein the in-line image comprises at least one of the accessed images associated with the first node in the social graph corresponding to the object.

2. The method of claim 1, wherein at least one of the computing devices is a server managing the message session.

3. The method of claim 1, wherein a third node in the graph corresponds to a concept, and wherein the identifier has a particular format and comprises a numerical identifier or a vanity identifier associated with the social-networking system.

4. The method of claim 3, wherein the object is a node corresponding to the second user.

5. The method of claim 3, wherein the object is a node corresponding to the concept.

6. The method of claim 1, wherein the identifier has a particular format and comprises:
    a URL;
    a portion of a URL;
    a numerical identifier; or
    a vanity identifier.

7. The method of claim 1, wherein the in-line image is provided for display to the second user if the second user has permission to view the in-line image.

8. The method of claim 1, wherein a size of the in-line image provided for display to the second user depends at least in part on a size of the text message.

9. One or more computer-readable non-transitory storage media in one or more computing systems, the media embodying logic that is operable when executed to:
- detect entry of an identifier of an object by a first user participating in a message session, wherein the detecting is based on the identifier being in a pre-determined text format, the message session comprising a text message including the identifier;
- determine a first node in a social graph of a social-networking system that corresponds to the object based at least in part on the identifier of the object;
- access one or more images corresponding to the object associated with the first node in the social graph; and
- send the text message to a second user in which the identifier included in the text message is replaced with an in-line image within the text message, wherein the in-line image comprises at least one of the accessed images associated with the first node in the social graph corresponding to the object.

10. The media of claim 9, wherein at least one of the computing systems is a server managing the message session.

11. The media of claim 9, wherein a third node in the graph corresponds to a concept.

12. The media of claim 11, wherein the object is a node corresponding to the second user.

13. The media of claim 11, wherein the object is a node corresponding to the concept.

14. The media of claim 9, wherein the identifier has a particular format and comprises:
- a URL;
- a portion of a URL;
- a numerical identifier; or
- a vanity identifier.

15. A first computing system comprising:
- a memory comprising instructions executable by one or more processors; and
- the one or more processors coupled to the memory and operable to execute the instructions, the one or more processors being operable when executing the instructions to:
  - detect entry of an identifier of an object by a first user participating in a message session, wherein the detecting is based on the identifier being in a pre-determined text format, the message session comprising a text message including the identifier;
  - determine a first node in a social graph of a social-networking system that corresponds to the object based at least in part on the identifier of the object;
  - access one or more images corresponding to the object associated with the first node in the social graph; and
  - send the text message to a second user in which the identifier included in the text message is replaced with an in-line image within the text message, wherein the in-line image comprises at least one of the accessed images associated with the first node in the social graph corresponding to the object.

16. The system of claim 15, wherein the computing system is a server managing the message session.

17. The system of claim 15, wherein a third node in the graph corresponds to a concept.

18. The system of claim 17, wherein the object is a node corresponding to the second user.

19. The system of claim 17, wherein the object is a node corresponding to the concept.

20. The system of claim 15, wherein the identifier has a particular format and comprises:
- a URL;
- a portion of a URL;
- a numerical identifier; or
- a vanity identifier.

* * * * *